United States Patent [19]

Rosario

[11] Patent Number: 4,663,609

[45] Date of Patent: May 5, 1987

[54] BRAKE ALERT DEVICE

[76] Inventor: George M. Rosario, 2408 Sitka St., San Leandro, Calif. 94577

[21] Appl. No.: 789,565

[22] Filed: Oct. 21, 1985

[51] Int. Cl.[4] .............................................. B60Q 1/44
[52] U.S. Cl. ................................... 340/72; 340/52 B; 340/67; 340/71; 340/81 R
[58] Field of Search .................... 340/72, 52 B, 67, 71, 340/81 R, 659; 315/72

[56] References Cited

U.S. PATENT DOCUMENTS 3,914,739  10/1975  Caughlin et al. ..................... 340/67
4,403,210   9/1983  Sullivan ................................. 340/72

Primary Examiner—James L. Rowland
Assistant Examiner—T. Rittmaster
Attorney, Agent, or Firm—Robert R. Tipton

[57] ABSTRACT

A brake light warning system for a motor vehicle causes the brakes lights to flash in a manner to attract the attention of a driver to the rear of the vehicle and provide a more effective warning of a slow down or stopping of the vehicle especially during foggy days or nights and when the view of a vehicle is partially obscured. Upon application of the brakes the brake lights are first caused to flash rapidly for 2 or 3 times for a first interval of time followed by prolonged "on" periods interrupted periodically by a short "off" period followed by a short "on" period followed by a short "off" period for a second interval of time as long as pressure is applied to the brake pedal of the vehicle.

6 Claims, 2 Drawing Figures

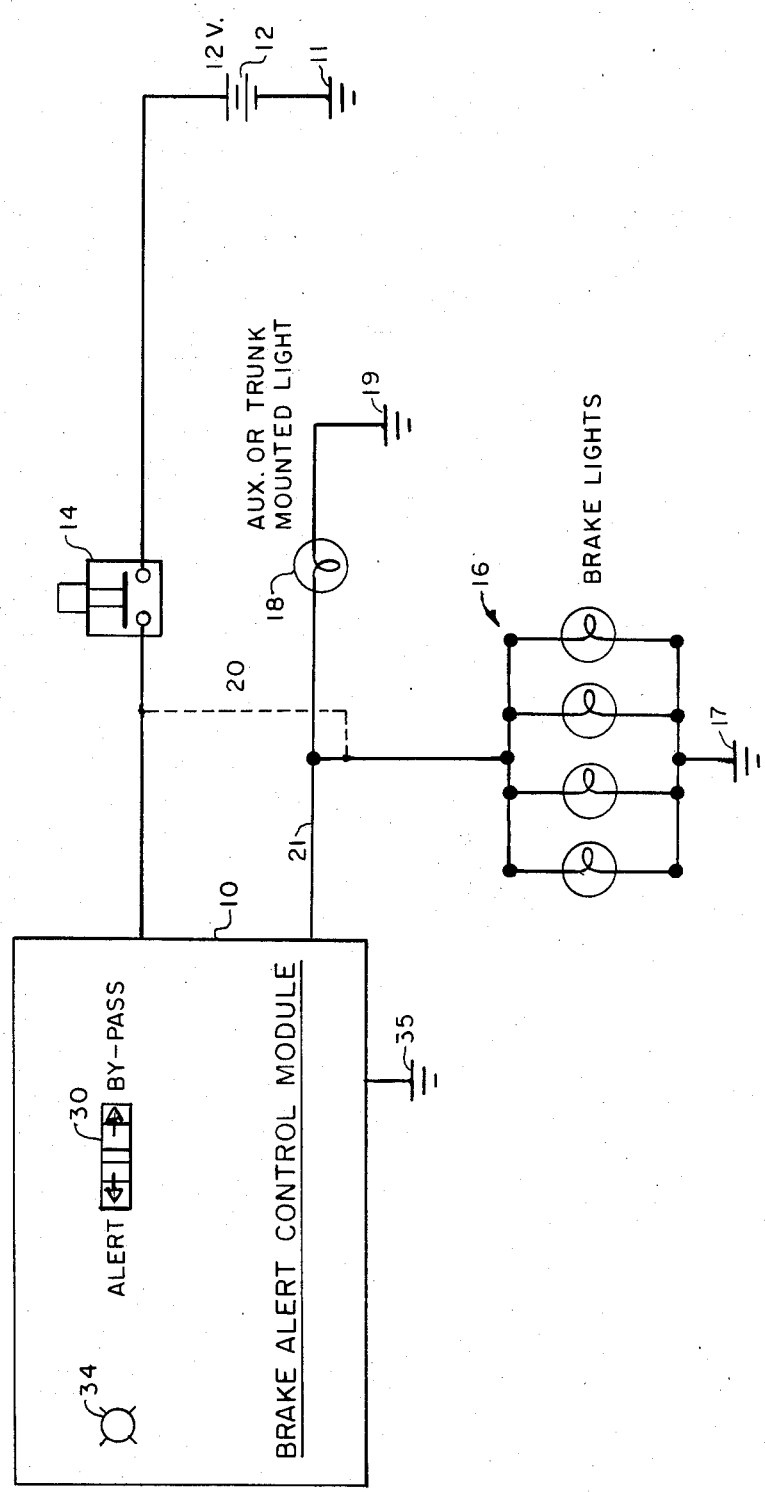

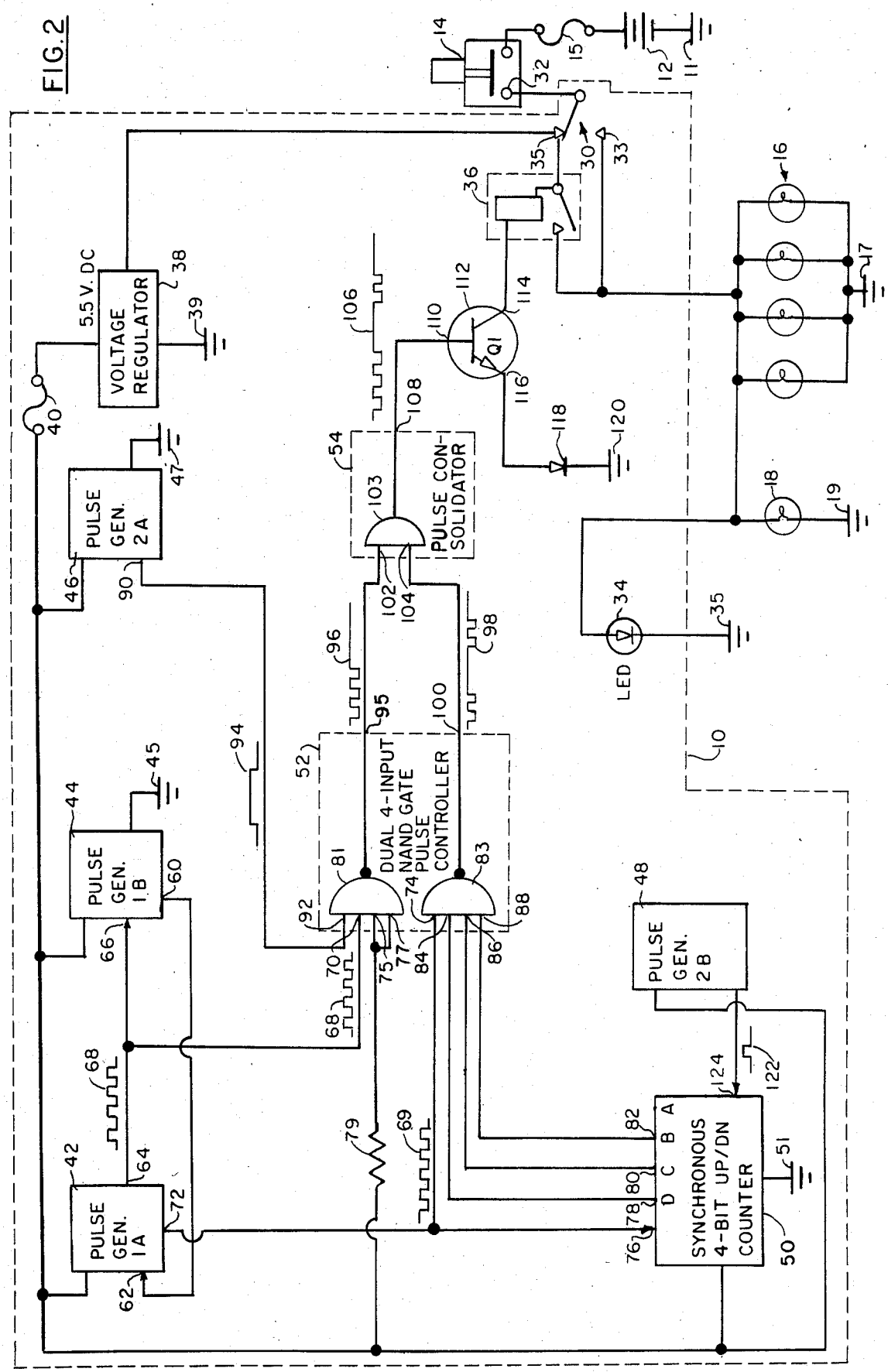

BRAKE ALERT DEVICE

BACKGROUND OF THE PRIOR ART

This invention relates generally to vehicle warning lights and in particular to vehicle warning lights that flash according to a particular pattern.

The vehicle warning lights of the prior art that were caused to flash were generally connected as part of a vehicle deceleration warning system.

A deceleration detector was connected to either a separate warning light system or connected as a part of the brake light system. A flickering or flashing means was, in certain instances, also connected to the warning light system. The flashing means disclosed by the prior art did not emit any special pattern of flashing signal.

In one prior art system, the brake lights are flashed only when a predetermine extra pressure is applied to the bracket pedal as, for example, during a "panic" stop.

Other vehicle light warning devices were connected to not only the brake pressure switch but also to a device coupled to the engine intake manifold to detect "idle", "cruising" and "passing" conditions.

Although the flashing of the brake lights of the prior art were designed to attract the attention of the motorist following the braking vehicle, the continuous rapid flashing of the brake lights tends to confuse the driver of the following vehicle once the driver's attention is attracted.

It is necessary, however, after initially attracting the driver's attention to maintain that attention only intermittently.

None of the prior art devices have considered this distinction. They have only considered a continuous single pattern of warning signal of a particular hazardous condition or variety of conditions.

All of the prior art devices were primarily mechanically actuated which made them complex and difficult for an ordinary person to install and repair.

SUMMARY OF THE INVENTION

The apparatus of the present invention is an improvement over the prior art devices that are used to energize a brake light system in that the brake alert apparatus of the present invention comprises a means for rapidly flashing the brake lights during a first interval of time followed by a second interval of time in which the lights are deenergized for short periods of time or flashed in a particular pattern of long and short flashes.

It is, therefore, an object of the present invention to provide a brake light device for alerting other drivers that the brakes of the vehicle are being applied.

It is a further object of the present invention to provide a brake alert warning device in which the brake lights are flashed in a particular pattern of short and long flashes.

It is another object of the present invention to provide a brake alert warning device in which the brake lights are flashed in one pattern of flashes during a first interval of time followed by a second period of time in which the brake lights are flashed in a different pattern of flashes such as two quick flashes.

It is yet another object of the present invention to provide a brake alert device in which the brake lights are flashed in a short burst of flashes during a first period of time followed by a second period of time in which the brake lights are flashed in a pattern of long and short flashes as long as pressure is applied to the brake pedal.

It is a further object of the present invention to provide a brake alert device in which the lights are flashed using a first pulse generator to generate a continuous flow of short pulses, an up/down counter to generate a pattern of long and short pulses and a third pulse generator to establish the length of the first interval of time in which the lights are flashed according to the pulses from the first pulse generator.

These and other objects of the present invention will become manifest upon study of the following detailed description when taken together with the drawings.

BRIEF DESCRIPTION OF THE DRAWINGS

FIG. 1 is a simplified circuit diagram of the brake alert apparatus of the present invention showing the basic connection of the brake alert controller to a conventional automotive brake light system.

FIG. 2 is a block diagram of the brake light controller of FIG. 1 and its connection to the brake light system of a motor vehicle.

DESCRIPTION OF THE PREFERRED EMBODIMENT

With reference to FIG. 1 there is illustrated a simplified circuit diagram of the brake alert apparatus of the present invention showing the basic connection of the brake alert controller 10 to a conventional automotive brake light system.

The general system illustrated comprises, basically, a brake alert controller 10 energized by a car battery 12 in conjunction with a brake operated pressure switch 14.

The output signal from brake alert controller 10 is connected to brake lights 16 and auxiliary or trunk mounted stop light 18.

In some instances, brake lights 16 might be electrically connected to conductor 20 between brake pressure switch 14 and brake alert controller 10 instead of to conductor 21, as shown, so that only auxiliary or trunk mounted stop light 18 is operated by brake alert controller 10.

With reference to FIG. 2 there is illustrated a block diagram of the brake light controller 10 of FIG. 1 and its connection to the brake light system of a motor vehicle illustrated in greater detail.

Brake alert controller 10 of FIG. 2 comprises, basically, by-pass switch 30 having its switch leg connected to the load side connector 32 of brake pressure switch 14. One output terminal 33 of by-pass switch 30 is connected directly to brake lights 16, auxiliary or trunk mounted brake light 18 and brake alert controller light emitting diode 34 thus by-passing brake alert controller 10 in the event brake alert module 10 malfunctions.

The other output terminal 35 of by-pass switch 30 is connected both to one side of brake light actuating relay 36 and the input side of voltage regulator 38.

Voltage regulator 38 is connected, on its output side, through protector fuse 40, to the input side of pulse generator (1A) 42, pulse generator (1B) 44, pulse generator (2A) 46, pulse generator (2B) 48, synchronous 4-bit up/down counter 50, dual 4-input Nand gate pulse controller 52 and pulse consolidator 54.

Typically, voltage regulator 38 will provide 5.5 volt D.C. power to energize the various components of brake alert module 10.

When brake pressure switch 14 is actuated, all of the above circuit elements are energized and the brake light flashing sequence is started.

In the present invention, two pulse durations are used in flashing brake lights 16 and 18.

During the first time interval, the short duration pulses are generated by pulse generators (1A) 42 and (1B) 44.

Pulse generators (1A) 42 and (1B) 44 are single pulse generators in which output side 60 of pulse generator (1B) 44 is connected to input side 62 of pulse generator (1A) 42 with output side 64 of pulse generator (1A) 42 connected to the input side 66 of pulse generator (1B) 44 in order to create a pulse generator whose pulse output is indicated by pulse signal 68.

Pulse signal 68 is then conducted to input terminal 70 of dual 4-input nand gate pulse controller 52.

Dual 4-input nand gate pulse controller 52 comprises 2 identical 4-input nand gates 81 and 83.

Another input side 72 of pulse generator (1A) 42 producing the same bit inverted pulse signal 69, is also connected to another input terminal 74 of Dual 4-input nand gate pulse controller 52 and also to the input side 76 of synchronous 4-bit up/down counter 50.

The remaining two terminals 75 and 77 of 4-input nand gate 81 of dual 4-input nand gate pulse controller 52 are connected together and to voltage supply and regulator 38 through resistor 79. Resistor 79 can be about 1K Ohm, typically.

Synchronous 4-bit up/down counter 50 is a standard binary counter in which the pulses from pulse generator (1A) 42 are counted and whose binary count signal from output terminals 78, 80 and 82 is electrically connected to input terminals 84, 86 and 88 of Dual 4-input nand gate pulse controller 52.

One output terminal 90 of pulse generator (2A) 46 is electrically connected to input terminal 92 of nand gate 81 of dual 4-input nand gate pulse controller 52 and is set to generate a long pulse 94 equivalent to 2 to 3 short pulses from pulse generator (1A) 42.

The pulse generated by pulse generator (2A) 46 controls the pulse pattern 96 or number of pulses generated by nand gate 81 at output terminal 95 of dual 4-input nand gate pulse controller 52 during the first interval of time.

The pulse pattern 98 from nand gate 83 appearing at output terminal 100 of dual 4-input nand gate pulse controller 52 is determined by the pattern of the binary counter (B, C, D) status from output terminals 78, 80 and 82 of synchronous 4-bit up/down counter 82 as it is matched to the input signal 68 at output side 72 from pulse generator (1A) 42 through 4-input nand gate 83 in dual 4-input nand gate pulse controller 52.

The resulting pulse pattern 98 comprises a long pulse followed by a short pulse which is repeated until brake alert controller 10 is deenergized by release of pressure on brake pressure switch 14.

It will be noted that pulse signal 96 from output terminal 95 of dual 4-input nand gate pulse controller 52 is connected to input terminal 102 of pulse consolidator 54 while signal 98 from output terminal 100 of dual 4-input nand gate pulse controller 52 is connected to input terminal 104 of pulse consolidator 54.

Pulse consolidator 54 comprises a single and gate 103 which allows pulse signal 96, comprising 2 to 3 short pulses, to pass through during the first interval of time as measured by pulse signal 94 and then allows pulse signal 98 to continue for the second interval of time.

The resulting output pulse signal pattern 106 is electrically connected from output terminal 108 of pulse consolidator 54 to base terminal 110 of transistor (Q1) 112.

The collector terminal 114 of transistor 112 is connected to control the coil of relay 36 while the emitter terminal 116 of transistor 112 is connected through silicon diode 118 to ground 120.

OPERATION

To operate the brake alert device 10 of the present invention, a driver of the vehicle using the brake alert device 10 of the present invention depresses the brake pedal to apply pressure to brake pressure switch 14.

Upon actuation of brake switch 14, current from battery 12 is allowed to flow through by-pass switch 30 energizing voltage regulator 38 and one side of the actuating coil of relay 36.

When voltage regulator 38 is energized, pulse generator (2B) 48 is energized to emit a single pulse 122 which is connected to input terminal 124 of synchronous 4-bit up/down counter 50 resetting the counter output to "zero". That is, the signal at each output terminal 78, 80 and 82 is initially set to a binary "0".

Concurrently, pulse generator (2A) 46 generates a single long pulse 94.

Also concurrently, pulse generators (1A) 42 and (1B) 44 begin oscillating to generate pulse train or signal 68.

Long pulse 94 from pulse generator (2A) 46 causes 4-input nand gate 81 in dual 4-input nand gate pulse controller 52 to generate output pulse pattern 96 comprising 2 to 5 short pulses which are connected to pulse consolidator 54.

The number of pulses occurring during the first interval of time may be limited to 3 where state vehicles codes limit the number of flashes permitted for brake lights.

The binary pattern on input terminals 84, 86 and 88 of dual 4-input nand gate pulse controller 52 is applied to 4-input nand gate 83 in dual 4-input nand gate pulse controller 52 which results in pulse pattern 98 appearing at input terminal 104 of pulse consolidator 104.

Because input and gate 103 in pulse consolidator 54 permits pulse signal 96 to pass before pulse signal 98, the resulting pulse signal 106 appears as pulse train or signal comprising 3 initial short pulses followed, during the second interval of time, by a long pulse followed by a short pulse followed by a long pulse, etc. at output terminal 108 of pulse consolidator 54 and at base 110 of transistor (Q1) 112.

Transistor (Q1) 112 acts as a switch such that when a voltage varying according to pulse pattern 106 is applied, relay 36 is pulsed in the same pattern causing brake lights 16, auxiliary or trunk mounted light 18 and light emitting diode 34 to flash in a similar sequence of pulses.

Thus is disclosed a brake alert device.

I claim:

1. In an automotive braking system including at least one brake light, means for energizing said brake light including a power source, a brake switch connected between said power source and said brake light and a brake pedal connected to said brake switch, said brake switch being actuated by pressure applied to said brake pedal, a brake alert warning apparatus comprising
   means connected between said brake switch and said brake light for rapidly flashing said brake light on and off several times at a frequency ranging from 1 to 10 flashes per second during a first period of time after application of pressure to said brake pedal, said means comprising
a first nand gate,
means for generating a plurality of short pulses having its output side connected to one input side of said first nand gate,
means for generating a single long pulse having its output side connected to another input side of said first nand gate to produce, at the output side of said first nand gate, a plurality of short pulses having a total duration of said single long pulse, and
means connected between said brake switch and said brake light for cyclically flashing said brake light on for periods ranging from 2 to 10 seconds and off for periods from 0.1 to 1.5 seconds during a second period of time after said first period of time.

2. In an automotive braking system including at least one brake light, means for energizing said brake light including a power source, a brake switch connected between said power source and said brake light and a brake pedal connected to said brake switch, said brake switch being actuated by pressure applied to said brake pedal, a brake alert warning apparatus comprising
a first pulse generator connected to said power source for generating electrical pulses ranging from 1 to 10 pulses per second,
means for limiting the output of said first pulse generator to generate several pulses upon initial actuation of said first pulse generator,
a second pulse generator adapted to generate a series of electrical pulses cyclically varying in duration,
means for consolidating said pulse from said first pulse generator with the pulses from said second pulse generator to produce a first pattern of electrical pulses during a first period of time and a second and different pattern of pulses during a second period of time,
a relay having an actuating coil and a pair of relay contacts,
said actuating coil connected to and actuated by said electrical pulses from said means for consolidating said pulses, said relay contacts serially connected between said brake switch and said brake light.

3. In an automotive braking system including at least one brake light, means for energizing said brake light including a power source, a brake switch connected between said power source and said brake light and a brake pedal connected to said brake switch, said brake switch being actuated by pressure applied to said brake pedal, a brake alert warning apparatus comprising
means connected to said power source for generating a first signal comprising a plurality of short electrical pulses,
means controlled to said power source for generating a second signal comprising a single long electrical pulse approximately equal to 2 to 5 short pulses,
means for combining said first signal and said second signal to generate a third signal comprising 2 to 5 short pulses during a first interval of time followed by a continuous electrical signal during a second interval of time as long as said means are energized,
means for generating a fourth signal comprising a long electrical pulse followed by a short electrical pulse which combination of pulses is repeated as long as said means are energized by said power source during said second interval of time,
means for combining said third signal and said fourth signal to produce a fifth signal comprising a series of 2 to 5 short electrical pulses during a first interval of time followed, during a second interval of time, by a long electrical pulse followed by a short electrical pulse which combination of pulses is repeated as long as said means are energized by said power source during said second interval of time,
means for connecting said electrical pulses to said brake light.

4. In an automotive braking system including at least one brake light, means for energizing said brake light including a power source, a brake switch connected between said power source and said brake light and a brake pedal connected to said brake switch, said brake switch being actuated by pressure applied to said brake pedal, a brake alert warning apparatus comprising
means connected between said power source and said brake light comprising
a first timer for generating a short duration timing pulse,
a second timer for generating a short duration timing pulse,
means for connecting said first timer to said second timer for generating a plurality of short duration pulses,
a third timer for generating a long duration pulse having a pulse length equal to from 2 to 5 short duration pulses generated by said first and second timers,
a first nand gate having 4 input terminals and one output terminal,
means for connecting the output signal from said first timer to one input terminal of said first nand gate,
means for connecting the output signal from said third timer to another input terminal of said first nand gate whereby the signal generated at said output terminal of said first nand gate comprises a series of 2 to 5 electrical pulses during a first interval of time equal to the duration of said long duration pulse generated by said third timer followed by a continuous voltage for a second interval of time,
a second nand gate having 4 input terminals and one output terminal,
a 4-bit up down counter having 4 output terminals and one input terminal,
means for connecting said output signal from said first timer to said input terminal of said 4-bit up down counter,
means for connecting 3 of said 4 output terminals of said 4-bit up down counter to 3 of said input terminals of said second nand gate,
means for connecting said output signal from said first timer to the fourth terminal of said second nand gate for generation of a signal comprising a long duration electrical pulse followed by a short duration electrical pulse that is repeated during a second interval of time as long as said timers are energized by said power source,
an and gate having a two input terminals and one output terminal,
means for connecting the output terminal of said first nand gate to one of said input terminal of said and gate,
means for connecting the output terminal of said second nand gate to the other input terminal of said and gate for generating an electrical signal at the output terminal of said and gate comprising 2 to 5 short duration electrical pulses during a first interval of time followed by an electrical signal comprising a long duration electrical pulse followed by a short duration electrical pulse which is repeated so long as said timers are energized during said second interval of time, means for connecting said output side of said and gate to said brake light to energize said brake light according to said electrical pulses generated at said output terminal of said third nand gate.

5. The automotive braking system as claimed in claim 4 wherein said means for connecting said output side of said AND gate to said brake light to energize said brake light comprises a power supply, a relay comprising an actuating coil and a pair of normally open contacts, a transistor having a base, a collector and an emitter, the base of said resistor connected to the output side of said and gate, the actuating coil of said relay connected in series with the collector of said transistor and said power supply, and said contacts of said relay connected in series with said brake lights and said power supply.

6. In an automotive braking system including at least one brake light, means for energizing said brake light including a power source, a brake switch connected between said power source and said brake light and a brake pedal connected to said brake switch, said brake switch being actuated by pressure applied to said brake pedal, a brake alert warning apparatus comprising means connected between said brake switch and said brake light for rapidly flashing said brake light on and off several times at a frequency ranging from 1 to 10 flashes per second during a first period of time after application of pressure to said brake pedal, said means comprising a first nand gate, means for generating a single long pulse having its output side connected to one input side of said first nand gate, means for generating a plurality of short pulses having its output side connected to another input side of said first nand gate, and means connected between said brake switch and said brake light for cyclically flashing said brake light on for periods ranging from 2 to 10 seconds and off for periods from 0.1 to 1.5 seconds during a second period of time after said first period of time, said means comprising a second nand gate, a synchronous four-bit, up/down counter having an input side and three output sides, means for generating a plurality of short pulses having its output side connected to one input side of said second nand gate and the input side of said synchronous four-bit, up/down counter, said three output sides of said synchronous four-bit, up/down counter connected to three input sides of said second nand gate, means for consolidating the output signals from said first and second nand gates connected to the output side of said first and second nand gates.

* * * * *